(12) United States Patent
Bigelow et al.

(10) Patent No.: US 7,100,874 B2
(45) Date of Patent: Sep. 5, 2006

(54) FLEXIBLE STRUCTURAL RESTRAINT LAYER FOR USE WITH AN INFLATABLE MODULAR STRUCTURE

(75) Inventors: Robert T. Bigelow, Las Vegas, NV (US); Aiken Brian, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 499 days.

(21) Appl. No.: 10/722,904

(22) Filed: Nov. 25, 2003

(65) Prior Publication Data

US 2005/0108950 A1    May 26, 2005

(51) Int. Cl.
  *E04B 1/34*   (2006.01)
  *B64G 1/12*   (2006.01)
(52) U.S. Cl. .................. 244/158.3; 52/2.19; 52/2.24
(58) Field of Classification Search ............... 244/5, 244/158.3, 159.4; 52/2.11, 2.13, 2.19, 2.24, 52/745.15
See application file for complete search history.

(56) References Cited

U.S. PATENT DOCUMENTS

| | | | | |
|---|---|---|---|---|
| 3,227,169 | A | * | 1/1966 | Fischer ..................... 52/2.19 |
| 3,390,491 | A | * | 7/1968 | Hayden et al. ........ 174/35 MS |
| 3,540,170 | A | * | 11/1970 | Flowers ................... 52/2.19 |
| 3,768,467 | A | * | 10/1973 | Jennings ............... 128/205.26 |
| 6,231,010 | B1 | | 5/2001 | Schneider et al. |
| 6,439,508 | B1 | | 8/2002 | Taylor |
| 6,547,189 | B1 | | 4/2003 | Raboin et al. |

* cited by examiner

*Primary Examiner*—Robert P. Swiatek
(74) *Attorney, Agent, or Firm*—Franklin E. Gibbs (57) ABSTRACT

A flexible structural restraint layer for use with an inflatable modular structure, having a fore and aft assembly separated by a longeron and an inflatable bladder. The restraint layer is comprised of two circumferential strap assemblies, each attachedly fastened at opposing ends of a radial strap assembly. There are a plurality of axial straps that are secured in place to the circumferential strap assemblies and the radial strap assembly. The restraint layer surrounds the bladder and the ends of the axial straps are secured in place at the fore and aft end of the modular structure. When the bladder is inflated, the structural restraint layer distributes the load created by the inflated bladder.

5 Claims, 11 Drawing Sheets

FLEXIBLE STRUCTURAL RESTRAINT LAYER FOR USE WITH AN INFLATABLE MODULAR STRUCTURE

BACKGROUND OF THE INVENTION

1. Field of the Invention

This invention relates to a flexible structural restraint layer for use with an inflatable module structure. The inflatable module structure has a rigid structural core and utilizes a flexible inflatable bladder. The flexible structural restraint layer works in conjunction with the bladder. In practice, the flexibility of the restraint layer is derived from utilizing flexible straps. The restraint layer surrounds the bladder and the restraint layer functions as a structure that distributes substantially the load from the bladder when the bladder is fully inflated. Loads are distributed from the restraint layer to the rigid structural core. In this way, the bladder experiences less stress when fully inflated.

2. Description of the Prior Art

Inflatable modular structures are well known in the art. For example, U.S. Pat. No. 6,439,058 to Taylor illustrates a module with a flexible shell and a bladder for inflation when deployed in space. While various aspects of the shell are identified, i.e. debris shield and bladder, no claim is drawn to a flexible restraint layer. Further, while the patent makes reference to a flexible restraint comprised of a weave of straps as part of the TransHab concept derived by NASA, none of the claims are drawn to this invention and no specific details are illustrative of this concept.

U.S. Pat. No. 6,231,010 to Schneider, et al, also addresses an inflatable modular structure. The Schneider invention does make reference to a structural restraint layer and claims a structural restraint as part of the module invention. However, there are no claims exclusively to the restraint layer and no mention is made as to the use of straps as part of the structural restraint layer.

U.S. Pat. No. 6,547,189 to Raboin, et al, identifies a structural restraint layer comprised of straps as part of an inflatable module. The restraint layer identified is drawn only to a weave of straps. Further, there are no claims drawn specifically to just the restraint layer. The woven strap restraint layer is identified as part of the module as a whole.

The drawback of the Raboin invention lies within the use of a weave of straps. Typically, the most efficient distribution of a load using a strap is where the load is applied along the length of the strap. As a strap is twisted or coiled, a portion of the load is directed away from the length of the strap. In this situation a load would be applied in an area that may not be specifically engineered to handle the load. This creates stress points along the strap where the strap is bent and that can lead to a failure of the strap. In a weave of straps, each strap is bent in numerous locations to conform to other straps in the weave. These bends can increase the possibility of failures.

A further drawback with the use of a weave is the amount of weight resulting from the number of straps being employed. In the weave are a large number of longitudinal strap (also referred to as an axial strap) to weave with the hoop straps. This is effectively a double layer of straps. As launch costs presently can be of the order of $10,000.00 per pound, this increased weight has an adverse fiscal impact.

Thus, the present invention has the distinct advantages of reducing the potential stress points on a strap and results in an assembly that has less weight and thereby reduces the cost to place a module in orbit.

BRIEF SUMMARY OF THE INVENTION

A flexible structural restraint layer for use with an inflatable module structure is claimed. The inflatable modular structure has a fore and aft assembly attached to a longeron and an inflatable bladder attached to the fore and aft assembly. The invention comprises a first and second circumferential strap assemblies and a radial strap assembly having opposing distal ends. The first and second circumferential strap assemblies are disposed on, and attachedly fastened to, the opposing distal ends of the radial strap assembly. There area a plurality of axial straps having opposing ends forming loops and the first and second circumferential strap assemblies and the radial strap assembly have guides to receive the axial straps. The axial straps are placed through the guides and the flexible structural restrain layer is placed over the bladder. The fore and aft assemblies receive the loops of the radial straps such that the flexible restraint layer is fixedly attached to the inflatable modular structure. When the bladder is inflated, the flexible structural restraint layer distributes the load from the inflated bladder.

The present invention may be best understood by reference to the following description taken in conjunction with the accompanying drawings.

DETAILED DESCRIPTION OF THE INVENTION

Figure 1:
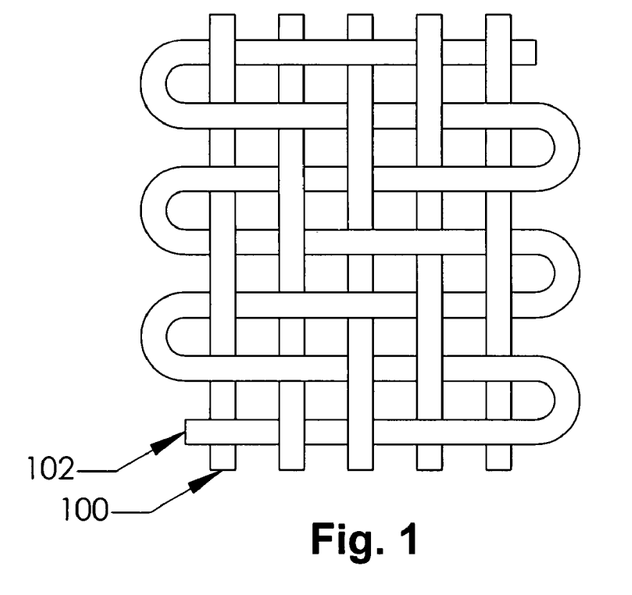
FIG. 1 is a top view of a Twill Weave.

The present invention may best be understood by reference to the following description taken in conjunction with the accompanying drawings. FIG. 1 is a top view of a segment of a Twill Weave. The Twill Weave is the weave for the preferred embodiment and is used to construct the straps.

Typically, a weave has a warp 100 (vertical) and weft (horizontal) 102 grouping of threads. In practice, the warp and weft threads are tightly interlaced with little, if any, space between the adjoining threads. It is this tight interlacing of threads that that results in a strong and durable fabric. This interlacing is typified in FIG. 2, which illustrates longitudinal cross-section of the Twill weave, and FIG. 3, which depicts the lateral cross section of the Twill Weave.

The threads are comprised of a lightweight, high strength, and low elongation material. In the preferred embodiment, the threads are made of Vectran. Other suitable high strength polymer materials that may be utilized include Kevlar.

Figure 2:
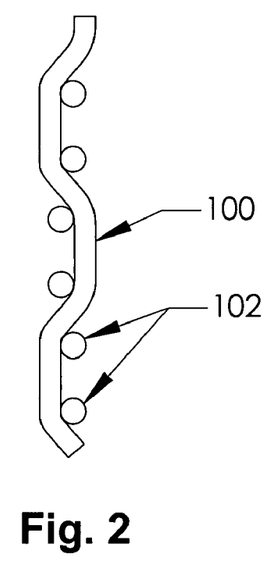
FIG. 2 is a partial cut-away longitudinal view of a Twill Weave.
Figure 3:
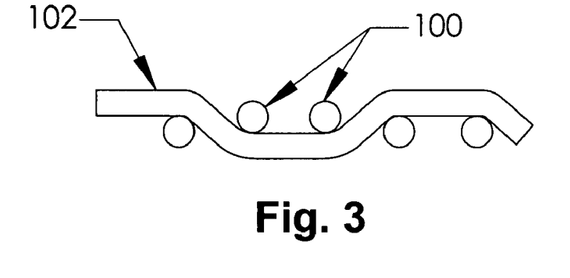
FIG. 3 is a partial cut-away lateral view of a Twill Weave.
Figure 4:
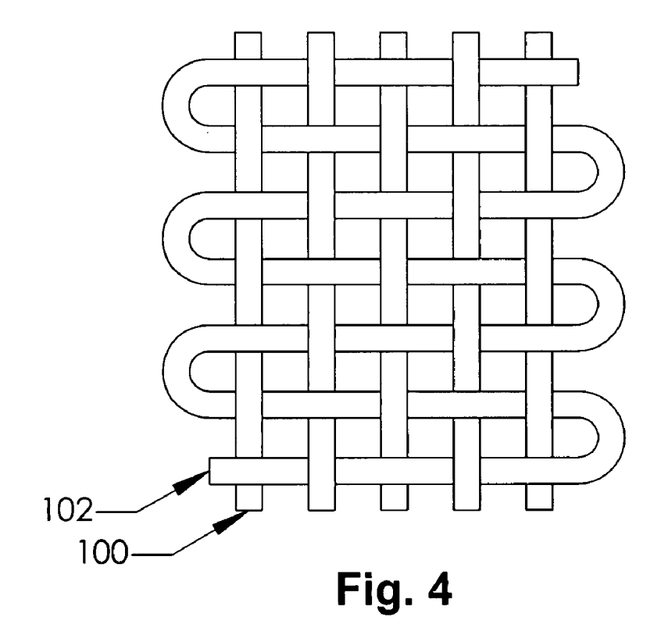
FIG. 4 is a top view of a Plain Weave.
Figure 5:
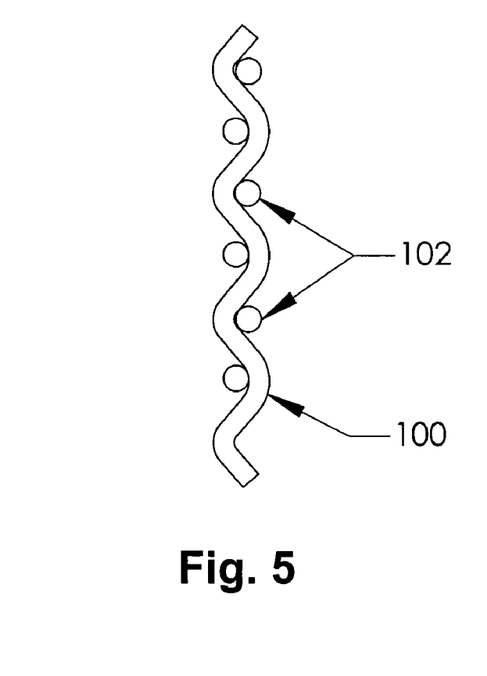
FIG. 5 is a partial cut-away longitudinal view of a Plain Weave.
Figure 6:
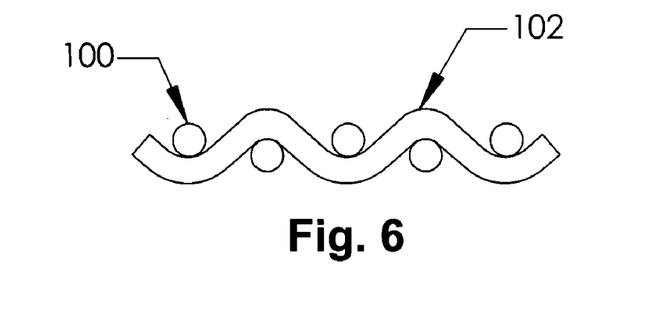
FIG. 6 is a partial cut-away lateral view of a Plain Weave.

While the Twill Weave of FIG. 1 is preferred, the weave is not restricted to just a Twill. Other weaves may be used as the application dictates. FIG. 4 illustrates a Plain Weave pattern. FIG. 5 is a cross-section of the longitudinal weave and FIG. 6 is a lateral cross section. It is readily apparent that the pattern of the Twill Weave in FIGS. 1, 2, and 3 is different from that of the Plain Weave of FIGS. 4, 5, and 6.

There are also patterns not depicted by the figures that are well known in the art such as the Hollander Weave, the Hollander Twill Weave, and the Reverse Hollander Weave. Any of these weaves, or combination of weaves, may be used. Also, weave patterns not identified above may be employed as needed.

Furthermore, a chosen weave pattern may be used repeatedly to form a single strap. For example, the Twill Weave of FIG. 1 is simplified for purposes of illustration and in practice this weave may be several layers thick and much wider than depicted. Also, the warp 100 and weft 102 threads may actually be a group of threads as opposed to a singular thread as depicted in the figures.

Figure 7:
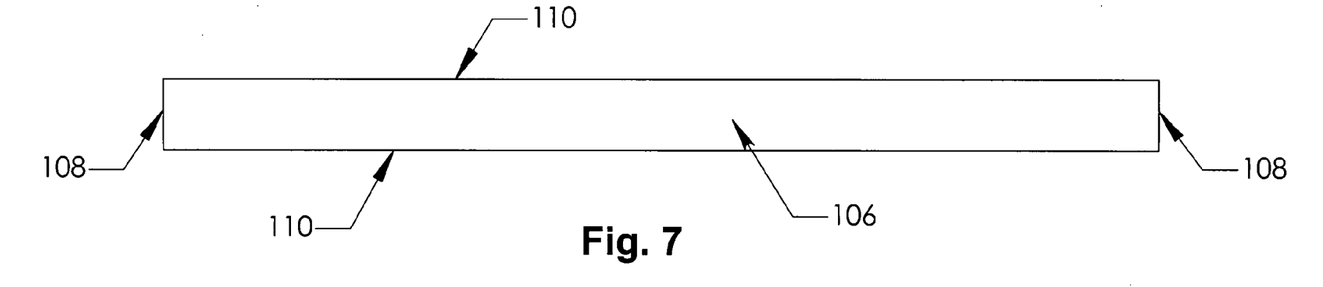
FIG. 7 is a top view of a strap.
Figure 7A:
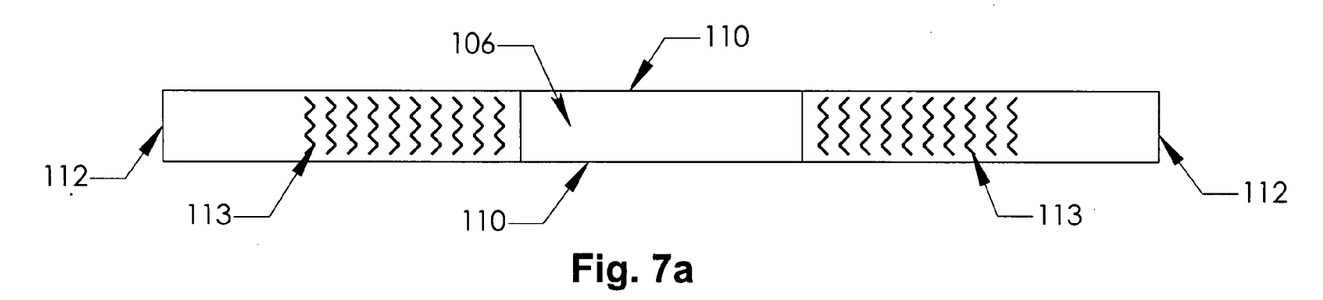
FIG. 7a is a top view of stitching on a strap securing two loops.
Figure 7B:
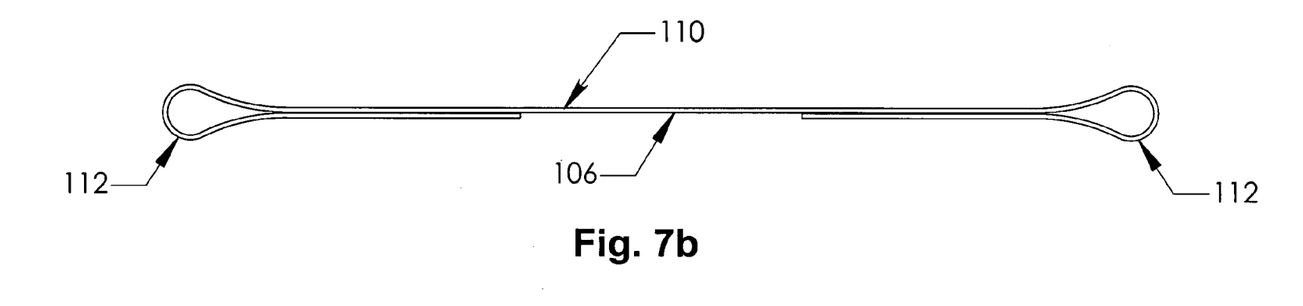
FIG. 7b is a side view of a strap having a loop at both ends.

Turning now to FIG. 7, a strap 106 is shown having opposing ends 108 and opposing edges 110. FIG. 7a illustrates a strap 106 having two loops 112 and the stitching 113 securing the end of the strap 108 to the strap 116. The stitching pattern for securing the loops is not limited to a particular pattern, but in the preferred embodiment, the pattern is a Bartack type stitch that is well known in the field. FIG. 7b shows a side view of a strap having a loop 112 at both ends. The loops of FIGS. 7a and 7b are formed by folding the end of a strap back onto the strap and stitching substantially the end of the strap with the strap. This is in fact the preferred embodiment. Straps with and without loops as depicted in FIGS. 7, 7a, and 7b will be referred to repeatedly throughout this detailed description.

Figure 8:
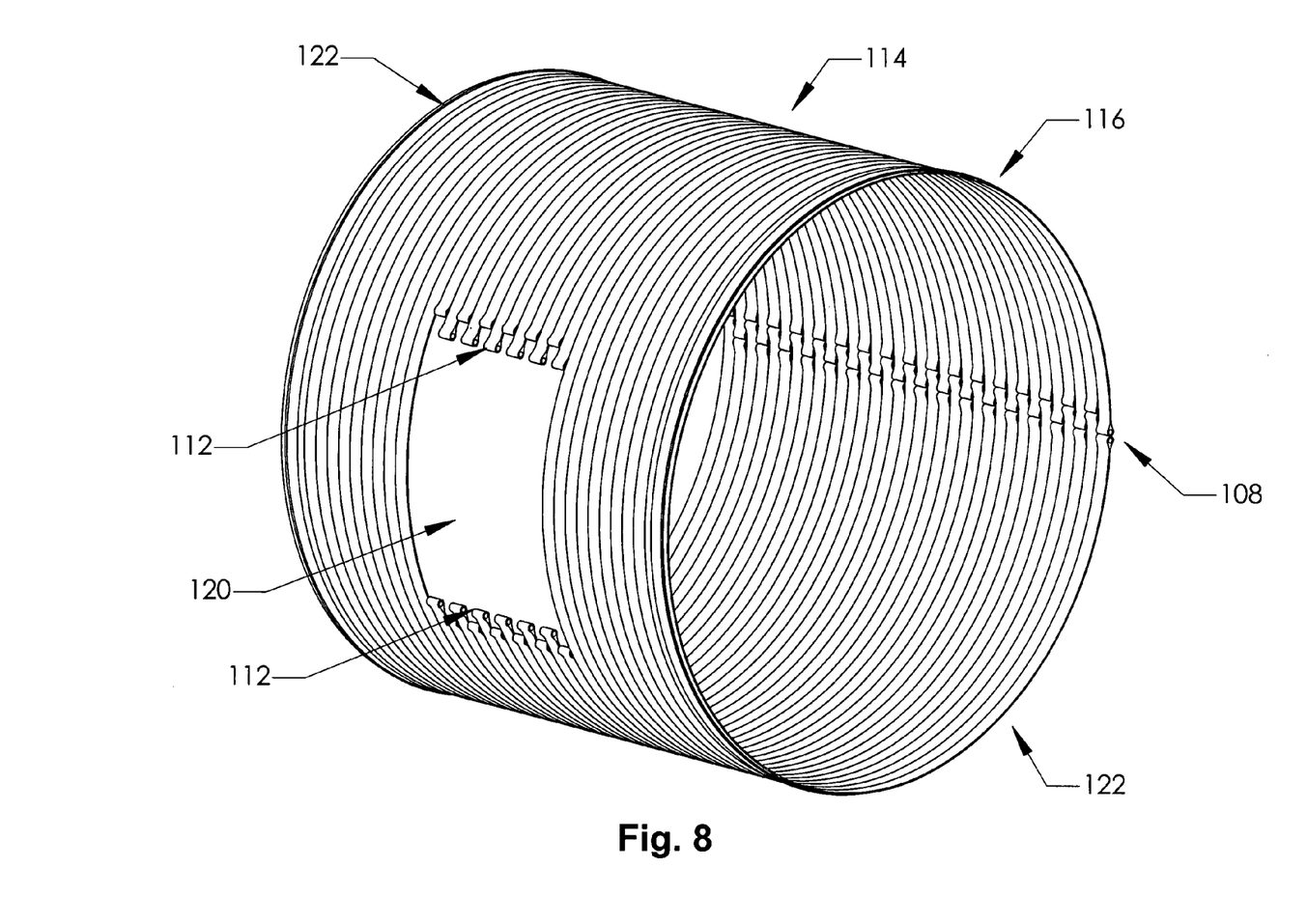
FIG. 8 is an isometric view of a radial strap assembly.

A radial strap assembly 114 is shown in FIG. 8 comprising a plurality of individual straps. In this application, the straps are elongated radial straps 116. Each elongated radial strap 116 is laid edge to edge and fixedly attached together by stitching.

Figure 9:
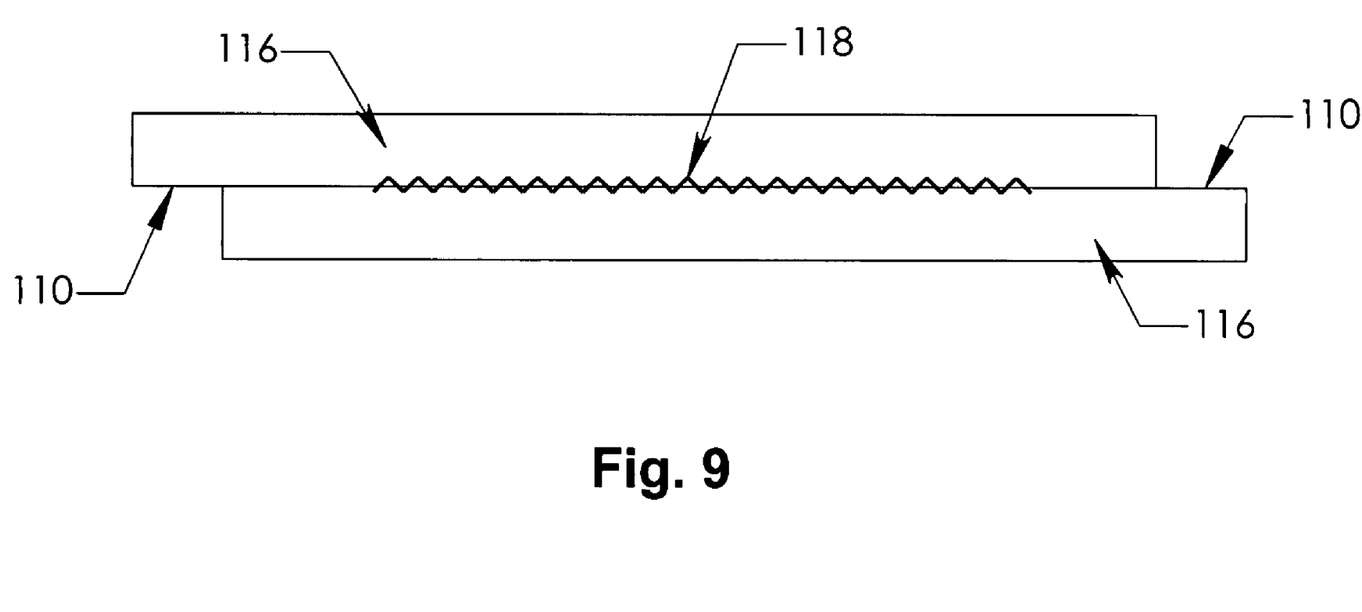
FIG. 9 is a top view of two straps illustrating the stitching between the straps.

The stitching attachment between straps is further identified in FIG. 9. The edges 110 of adjoining straps are brought together and a stitch 118 is used to secure the edges together. The figure depicts a distance between the opposing edges 110 for purposes of illustration only. In application, the edges 110 are brought together. Further, the type of stitching pattern utilized will be dependent upon the application. When the straps are laid side-by-side, or edge-to-edge, or adjacent to one another, then they are said to be abutting one another. In the preferred embodiment, the stitching pattern is a zig-zag pattern. However, other stitch patterns may be used and dictated by the specific situation.

Returning now to FIG. 8, the figure portrays a window opening 120 in the radial strap assembly 114. At least one window opening is present in the preferred embodiment. However, alternate embodiments can have multiple window openings or none at all.

The elongated radial straps 116 on both sides of the window opening 120 have the opposing ends 108 stitched together. In the proximity of the window opening 120, the elongated radial straps 116 have a loop 112 for attaching to a window assembly. In this case, the opposing end 108 of the elongated radial straps 116 is stitched to the opposing end 108 of another elongated radial strap 116 also having a loop 112. In another embodiment, each strap on both sides of the window opening can be a single strap with a loop at both ends, rather than two straps stitched together. In practice, the window opening would be through the bladder of an inflatable modular structure and would work with a window assembly.

Figure 10:
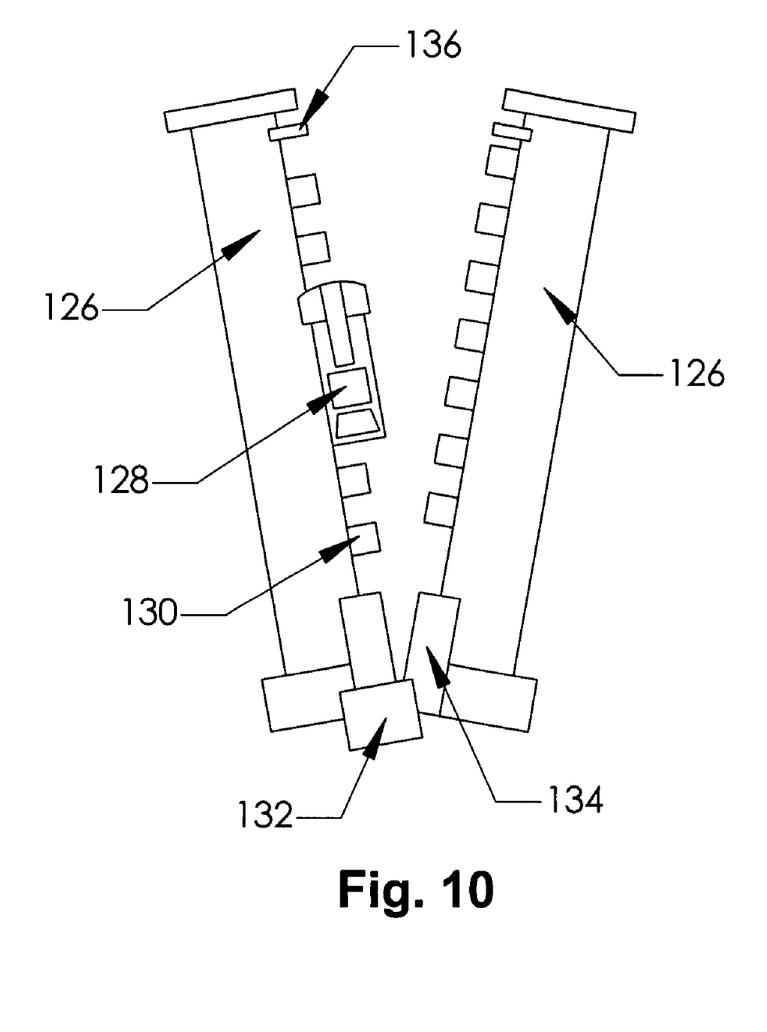
FIG. 10 is a top view of a zipper assembly.

Referring now to FIG. 10, a zipper fastener 124 is illustrated. This is a typical zipper assembly having opposing tapes 126, a pull tab 128, teeth 130 on each opposing tape 126, a box, 132, a pin, 134, and a top stop 136.

Returning now to FIG. 8, the opposing distal ends 122 of the radial assembly 114 are sewn to a tape 126 of a zipper fastener as typified in FIG. 10.

Figure 11:
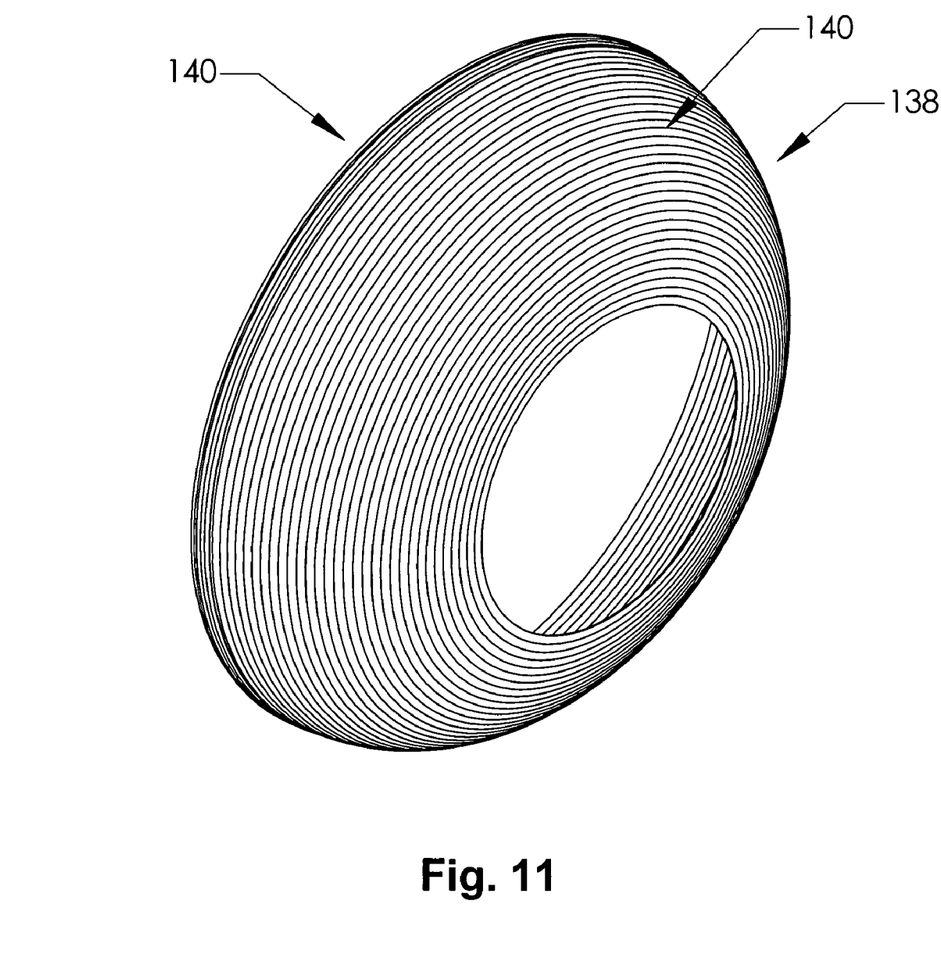
FIG. 11 is an isometric view of a circumferential strap assembly.

Addressing FIG. 11, the circumferential strap assembly 138 is shown. There are two such assemblies, first and second circumferential strap assemblies, and one assembly fits to each end of the radial strap assembly discussed above. The straps used in the circumferential strap assembly have opposing ends as identified in FIG. 7 and are referred to here as elongated circumferential straps 140. Each circumferential strap 140 has a different length from the other straps. This is due to the fact that the circumferential straps 140 are positioned to form substantially a half sphere when laid edge to edge.

Again, as in the case of the radial strap assembly, the circumferential straps are laid edge-to-edge and stitched together. Along the edge of the longest strap 142 the opposing mating tape 126 of FIG. 10 is sewn into place. This allows the circumferential strap assembly to fasten to the radial strap assembly by way of the zipper fastener.

Figure 12:
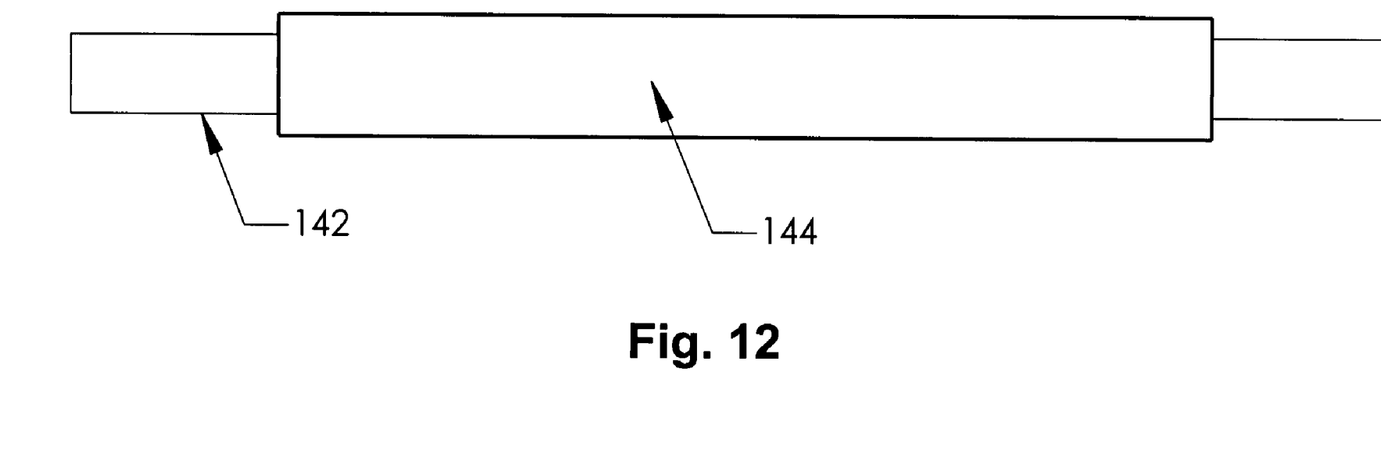
FIG. 12 is a top view of a guide with a radial strap.

FIG. 12 illustrates an axial strap 142 disposed within a guide 144. The guide is made of Vectran in the preferred embodiment and is attached to the circumferential and radial strap assemblies. The guide acts to align the axial straps. In the preferred embodiment, the guides are secured in place with stitches. The guides may take the form of a sleeve that fits over the strap. In alternate embodiments, the guide may take the form of another material that is lightweight, high strength, and exhibits low elongation. This could include materials having Kevlar. In this fashion, the axial strap 142 is kept in place without being sewn to the circumferential strap assemblies or the radial strap assembly. The axial strap 142 is of the form of the strap illustrated in FIG. 7b and has loops 112 at each end.

Figure 13:
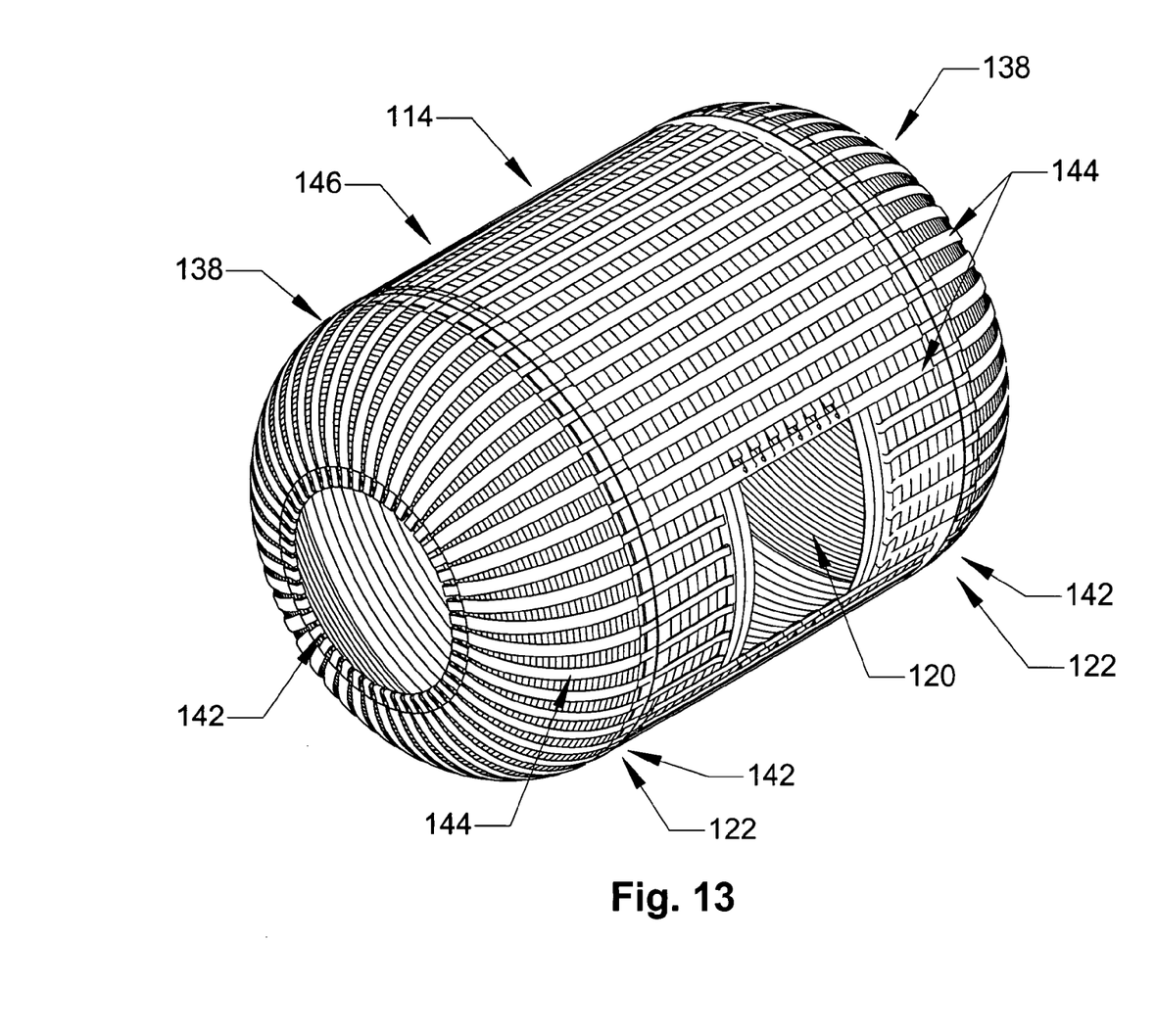
FIG. 13 is an isometric view of the assembled flexible restraint layer.

To further illustrate this point, FIG. 13 shows the assembled flexible restraint layer 146. In this illustration, the guides 144 are disposed at intervals on the surface of the radial strap assembly 114 and the circumferential strap assemblies 138. The guides 144 are sewn into place. The axial straps 142 fit within the guides 144. At both ends of the flexible restrain layer 146 the ioops 112 of the axial straps 142 extrude beyond the circumferential strap assemblies 138.

In the proximity of the window opening 120, the axial straps take the form of the straps identified in FIG. 7b with loops at both ends. The difference between the straps in the area of the window opening and the remaining axial straps is in the length of the straps. In regards to the window opening, the axial straps extend from the fore or aft assembly to the area of the window opening. Then on the other side of the opening, another strap extends to the other assembly. The other axial straps that do not encounter the window opening extend from the fore to the aft assemblies without interruption.

Figure 14:
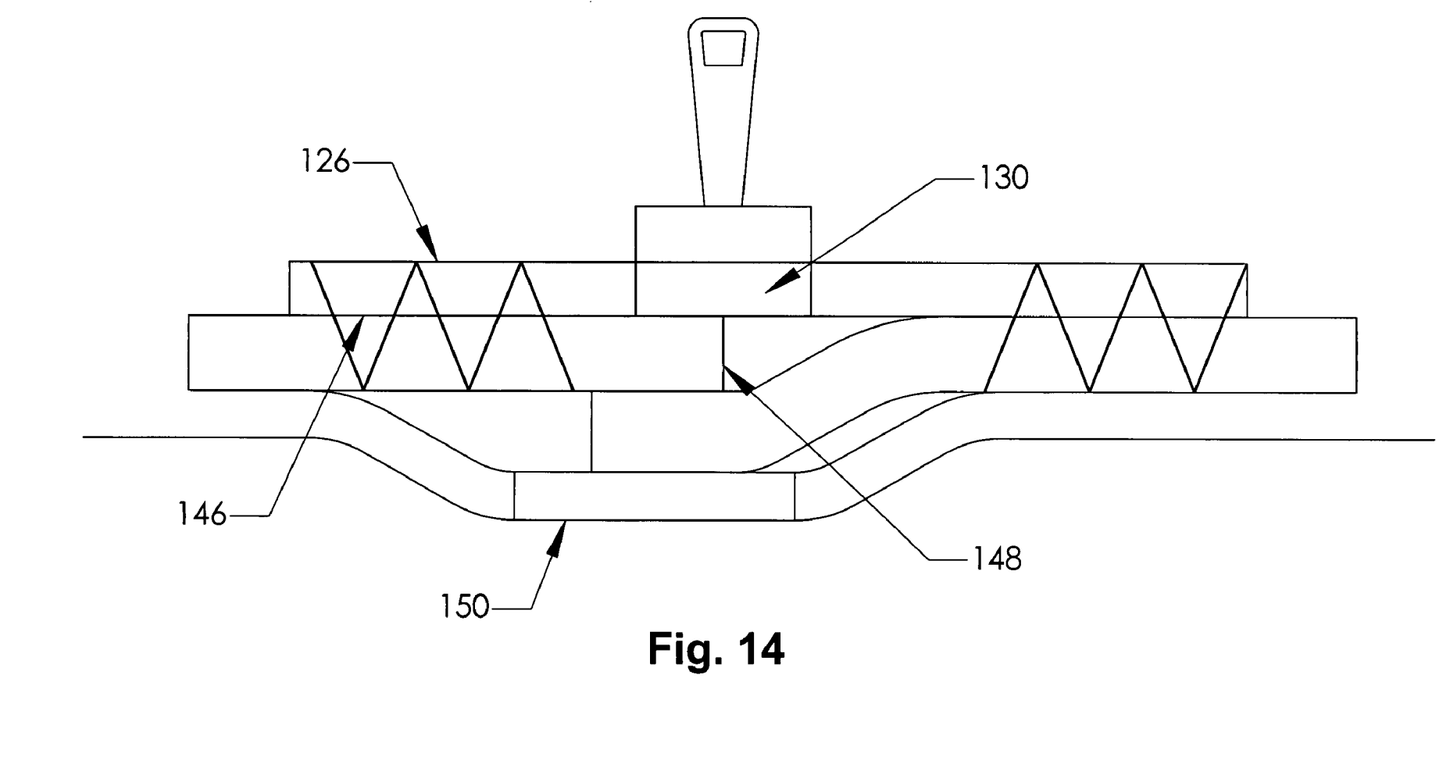
FIG. 14 is cross-sectional view of a zipper assembly sewn to a pair of straps.

The circumferential strap assemblies 138 are fastened to the radial strap assembly 144 by way of the zipper fastener. As illustrated, there are two circumferential strap assemblies. Again, they are referred to as the first and second circumferential strap assemblies. FIG. 10 illustrates how the zipper would engage and thereby fasten the circumferential strap assemblies 138 to the radial strap assembly 144. Turning now to FIG. 14, the tape 126 is sewn 146 to a strap 106. When the zipper teeth 130 are engaged, the straps 106 overlap 148. This overlap helps to insure that the bladder 150 is not pinched or cut by the zipper. In an alternate embodiment, the straps do not overlap, but rather meet side by side to protect the bladder from the zipper.

Figure 15:
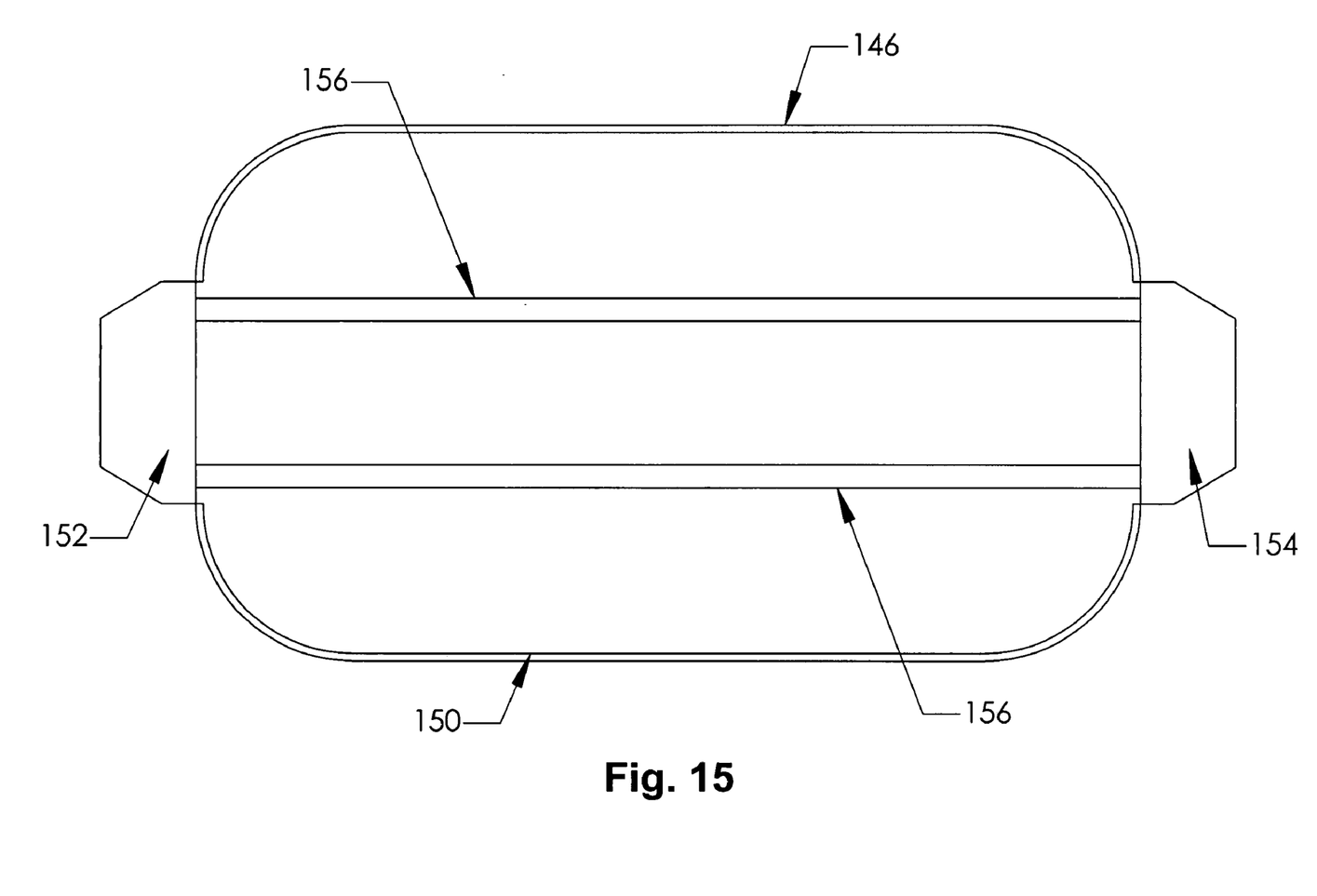
FIG. 15 is a cross-sectional isometric view of the flexible restraint layer assembled with the bladder and the rigid structural core.

Addressing now FIG. 15, the flexible restraint layer 146 covers the bladder 150. The restraint layer 146 and the bladder 150 are securely fastened to the fore 152 and aft 154 assemblies while the longerons 156 separate the fore and aft assemblies. Fastening of the bladder to the fore and aft assemblies is accomplished by known means such as the use of end rings and/or attachment rings. The fore and aft assemblies and the longeron compose the rigid structural core. In the preferred embodiment, there are four longerons 156, the fore assembly 152 is an airlock that is adapted to hold the strap ioops 112 securely in place by known conventional means such as the use of rollers or a bar, and the aft assembly 154 is used primarily for storage, but also has the same means for securing the strap loops 112. Also, the fore and aft assemblies are adapted to secure the bladder in place. In an alternative embodiment, the aft assembly 154 may also be an airlock. Further, in the preferred embodiment, the fore and aft assemblies are made of steel and the longerons are made of aluminum. However, this does not limit the use of other rigid structural materials.

When the bladder 150 is inflated, the flexible restraint layer 146 provides the outer boundary for the expansion of the bladder. The load is distributed through the restraint layer 146 to the fore 152 and aft 154 assemblies and the longerons 156. In this way, the bladder does not bulge out beyond an acceptable limit.

There has thus been described a novel flexible restraint layer for us with an inflatable modular structure. It is important to note that many configurations can be constructed from the ideas presented. The foregoing disclosure and description of the invention is illustrative and explanatory thereof and thus, nothing in the specification should be imported to limit the scope of the claims. Also, the scope of the invention is not intended to be limited to those embodiments described and includes equivalents thereto. It would be recognized by one skilled in the art the following claims would encompass a number of embodiments of the invention disclosed and claimed herein.

What is claimed is:

1. A flexible restraint layer for use with an inflatable modular structure where the inflatable modular structure has a rigid structural core comprised of a fore and aft assembly and at least one longeron attached to the fore and aft assemblies and separating the fore and aft assemblies, at least one bladder capable of being inflated and the at least one bladder being fixedly attached to the fore and aft assemblies, the flexible restraint layer comprising:

a first and second circumferential strap assemblies;
a radial strap assembly having opposing distal ends;
the first and second circumferential strap assemblies disposed on, and attachedly fastened to, the opposing distal ends of the radial strap assembly;
a plurality of axial straps having opposing ends forming loops;
the first and second circumferential strap assemblies and the radial strap assembly having guides to receive the axial straps and the axial straps being disposed within the guides;
the flexible restraint layer being disposed substantially between the fore and aft assemblies of the inflatable modular structure and covering the at least one bladder; and
the fore and aft assemblies being adapted to receive the loops of the axial straps such that the flexible restraint layer is fixedly attached to the inflatable modular structure and restrains the bladder when the at least one bladder is inflated.

2. The flexible restraint layer of claim 1 wherein the first circumferential strap assembly is attachedly fastened to the radial strap assembly by way of a first zipper assembly and the second circumferential strap assembly is attachedly fastened to the radial strap assembly by way of a second zipper assembly.

3. A flexible restraint layer as in claim 1 wherein the first and second circumferential strap assemblies further comprising:

a plurality of elongated circumferential straps, wherein each elongated circumferential strap terminates in opposing ends, has opposing edges, has a length, and each strap in an assembly has a different length from any other strap in that assembly;
the elongated circumferential straps are disposed adjacent to one another and abutting one another in an edge to edge manner in a substantially circular pattern such that the elongated circumferential straps form substantially a half sphere and the opposing ends of the circumferential straps are stitched together thus forming a radial strap assembly that is substantially in the form of a half sphere;
a stitching pattern applied to said elongated circumferential straps to connect said elongated circumferential straps; and
a fastener applied to the strap of the greatest length at the end of the half sphere formed by the straps.

4. A flexible restraint layer as in claim 1 wherein the radial strap assembly further comprises:

a plurality of elongated radial straps wherein each elongated radial strap terminates in opposing ends, has opposing edges, and has a length;
the elongated radial straps are disposed adjacent to one another such that the elongated radial straps lie edge to edge;
a stitching pattern applied to said elongated radial straps to connect said elongated radial straps;
a fastener applied to the straps at the opposing distal ends; and
the straps at the opposing longitudinal ends are stitched together thus forming a radial strap assembly that is substantially cylindrical in form.

5. A flexible restraint layer as in claim 1 further comprising at least one window opening extending through the restraint layer.

* * * * *